US007811404B2

(12) United States Patent
Wade

(10) Patent No.: US 7,811,404 B2
(45) Date of Patent: Oct. 12, 2010

(54) APPLYING ADHESIVE LABELS TO PRODUCTS AND PRODUCT CONTAINERS

(75) Inventor: Richard Wade, Leeds (GB)

(73) Assignee: Catchpoint Limited, Lancashire (GB)

( * ) Notice: Subject to any disclaimer, the term of this patent is extended or adjusted under 35 U.S.C. 154(b) by 0 days.

(21) Appl. No.: 10/520,002

(22) PCT Filed: May 21, 2003

(86) PCT No.: PCT/GB03/02199

§ 371 (c)(1), (2), (4) Date: Aug. 16, 2005

(87) PCT Pub. No.: WO2004/005141

PCT Pub. Date: Jan. 15, 2004

(65) Prior Publication Data

US 2006/0037693 A1 Feb. 23, 2006

(30) Foreign Application Priority Data

Jul. 3, 2002 (GB) ................................ 0215374.0

(51) Int. Cl.

| | |
|---|---|
| ***B29C 65/48*** | (2006.01) |
| ***B29C 65/56*** | (2006.01) |
| ***B32B 37/10*** | (2006.01) |
| ***B32B 37/14*** | (2006.01) |
| ***B32B 37/26*** | (2006.01) |
| ***B32B 38/04*** | (2006.01) |
| *B29C 65/78* | (2006.01) |
| *B32B 38/18* | (2006.01) |
| *B65G 47/14* | (2006.01) |
| *B65H 3/58* | (2006.01) |

(52) U.S. Cl. ....................... 156/257; 156/236; 156/247; 156/248; 156/249; 156/261; 156/264; 156/267; 156/268; 156/269; 156/270; 156/297; 156/289; 156/305; 156/324; 221/1; 221/26; 221/33

(58) Field of Classification Search ................. 156/236, 156/284, 289, 291, 305, 308.8, 247–249, 156/250, 257, 261, 264, 265, 267–270, 297, 156/324; 221/1, 25, 26, 33

See application file for complete search history.

(56) References Cited

U.S. PATENT DOCUMENTS 3,450,590 A 6/1969 La Mers (Continued)

FOREIGN PATENT DOCUMENTS

WO WO 00/30963 6/2000

*Primary Examiner*—Philip C Tucker
*Assistant Examiner*—Sonya Mazumdar
(74) *Attorney, Agent, or Firm*—Klauber & Jackson LLC

(57) ABSTRACT

A web (36) of paper or the like has labels (42) defined therein by printing the web (36) followed by skip cutting (40) the web to define the label boundaries. The skip cutting (40) leaves the labels (42) connected to the remainder of the web (36) by breakable catch points (44). The labels (42) are rendered capable of being applied to product containers (16) by the web (36) having adhesive applied to the side opposite the printing, and the web (36) is rendered capable of being wound up by having an adhesive release coating, such as silicone, applied over the printing. By providing such a construction, the web can be fed through conventional applicator machinery in which, as the web passes over an applicator beak, sequentially the label leading edges of the labels protrude from web, and attach to product containers moving synchronously through the machinery, and as the application process continues, the catch points break resulting in complete removal of the labels from the web and application to the containers.

9 Claims, 4 Drawing Sheets

U.S. PATENT DOCUMENTS

| | | | | | |
|---|---|---|---|---|---|
| 3,880,692 | A | | 4/1975 | Jeffries | |
| 3,920,122 | A | * | 11/1975 | Koehlinger et al. | 206/390 |
| 4,354,894 | A | * | 10/1982 | Lewis et al. | 156/517 |
| 4,680,080 | A | * | 7/1987 | Instance | 156/357 |
| 4,863,772 | A | * | 9/1989 | Cross | 428/41.8 |
| 5,112,427 | A | * | 5/1992 | Bekker-Madsen | 156/259 |
| 5,275,678 | A | * | 1/1994 | West et al. | 156/215 |
| 5,380,381 | A | * | 1/1995 | Otruba | 156/64 |
| 5,417,783 | A | * | 5/1995 | Boreali et al. | 156/64 |
| 5,466,321 | A | * | 11/1995 | Miyaji | 156/260 |
| 5,573,621 | A | * | 11/1996 | Boreali | 156/256 |
| 6,030,482 | A | * | 2/2000 | Osaka | 156/289 |
| 6,280,549 | B1 | | 8/2001 | Langan | |
| 6,571,983 | B1 | * | 6/2003 | Schumann et al. | 221/25 |
| 6,923,235 | B2 | * | 8/2005 | Petitjean | 156/353 |
| 2001/0027845 | A1 | | 10/2001 | Tasma | |
| 2006/0233995 | A1 | * | 10/2006 | Garland | 428/41.8 |

* cited by examiner

APPLYING ADHESIVE LABELS TO PRODUCTS AND PRODUCT CONTAINERS

CROSS REFERENCE TO RELATED APPLICATIONS

The present application is a National Stage Application claiming the priority of co-pending PCT Application No. PCT/GB2003/002199 filed May 21, 2003, which in turn, claims priority from Great Britain Application Serial No. 0215374.0, filed Jul. 3, 2002. Applicants claim the benefits of 35 U.S.C. §120 as to the PCT application and priority under 35 U.S.C. §119 as to the said Great Britain application, and the entire disclosures of both applications are incorporated herein by reference in their entireties This invention relates to a method of applying adhesive labels to products and product containers. The adhesive labels will usually be of the self adhesive type, which are used extensively in relation to many hundreds of products, but the invention can also be applied, with appropriate modification, to the labels which are of the type requiring the application of moisture to activate adhesive carried by the label. The labels to be applied may be of any suitable material, although in the vast majority of cases, the labels will be of paper. The invention also applies to the labels themselves.

As indicated above, self adhesive labels are used in connection with many hundreds of products, especially those products which are packaged in containers made of glass, cardboard, plastics and metal. The labels are applied one by one to respective ones of said containers. They may be applied directly to the products where appropriate, but in the interests of simplicity reference will be made hereinafter to product containers only, but it has to be kept in mind that references to products containers also includes references, where appropriate, to the products themselves, and to larger receptacles which may contain a plurality of individual containers.

Self adhesive labels conventionally are carried on what is called a release web, which is a web of paper which has been coated with a silicone compound. The labels have the adhesive on one side and are carried by the web at equally spaced intervals by having the adhesive side applied to the silicone side of the web. By virtue of the silicone coating on the web, the labels can be readily peeled from the web (by overcoming the adhesive force between the adhesive and the web) and respectively applied to the individual containers. The operation is carried out by applicator machinery or by hand.

This method is well established and is practised extensively all over the world. Consequently, the applicator machinery for performing the method is well established and reliable. It operates basically by having a beak around which the carrier web, with the labels thereon, is fed. The beak defines a reverse fold angle (greater than 90 degrees) and so as the web passes around it, the leading edge of each label is effectively "peeled" away from the carrier web, and that leading edge is applied to the product container, which is moving in synchronism with the web, and continued movement of the web and container results in the label being completely removed from the web and completely applied to the container The problem with the established method is that the silicon web is only a carrier web, and consequently after the labels have been removed, the web has to be scrapped. This clearly represents wastage and increased costs. Much time and effort has been applied to devising a method wherein a carrier web is not needed, but heretofore there has not been a commercially acceptable solution to this problem.

In one prior suggestion, a single web on which the labels were printed, and on opposite sides of which were applied respectively a layer of silicone coating (over the printing) and a layer of adhesive, was suggested, but this web required the labels to be cut by special cutting machinery from the web at the vicinity of where the labels were applied to the product containers, so that the cutting machinery had to be in synchronous register with the applicator machinery. The web therefore had to have sprocket feed holes. Custom equipment had to be designed and built to enable the method to be performed. To maintain the register and accurately place the labels on the product containers proved to be too great a task and so the system was not successful.

The present invention seeks to overcome the above problem of having to use a carrier web for the labels, but seeks to overcome it in a manner, which does not suffer from the difficulties of the previous attempt.

In accordance with the present invention, a method of applying adhesive labels to product containers comprises using a single web on which the labels are printed at spaced intervals, and the label boundaries are defined in the web by lines of cutting leaving the so defined labels connected to the reminder of the web by catch points, and wherein to remove the labels the web is fed around a guide, of the same function and operation as the conventional beak of conventional applicator machinery, which causes the leading edge of each label to protrude out of the plane of the web and the protruding edge forms a means whereby the remainder of the label can be extracted from the web by the breaking of the catch points.

An immediate advantage of the invention is that it does not require the designing and building of special machinery, and the conventional applicator machinery can be used. That is not to say that the special machinery must not be used. It will be a matter of choice for the user. Indeed depending upon the shape of the label, it may be that the guide may have to be specifically designed in relation to where the catch points are located, it being desired that the leading edge of each label should be sufficiently devoid of catch points to ensure that it will reliably protrude from the web when it first passes round the guide.

The labels will normally be of the self adhesive type to ensure that no additional stations need to be provided on the applicator machinery, but it is within the invention to provide that there may be a water application station if the adhesive needs to be wetted to be made effective. Indeed, I also envisage that the adhesive may be applied immediately before the web passes round the guide.

The important point about this invention is that the carrier web is eliminated, providing all of the advantages associated with the removal of this web.

The invention also extends to labels for the aforesaid method defined in a web by cuts leaving catch points connecting the labels to the remainder of the web.

An example of the method of the invention will now be described, with reference to the accompanying diagrammatic drawings, wherein.

Figure 1:
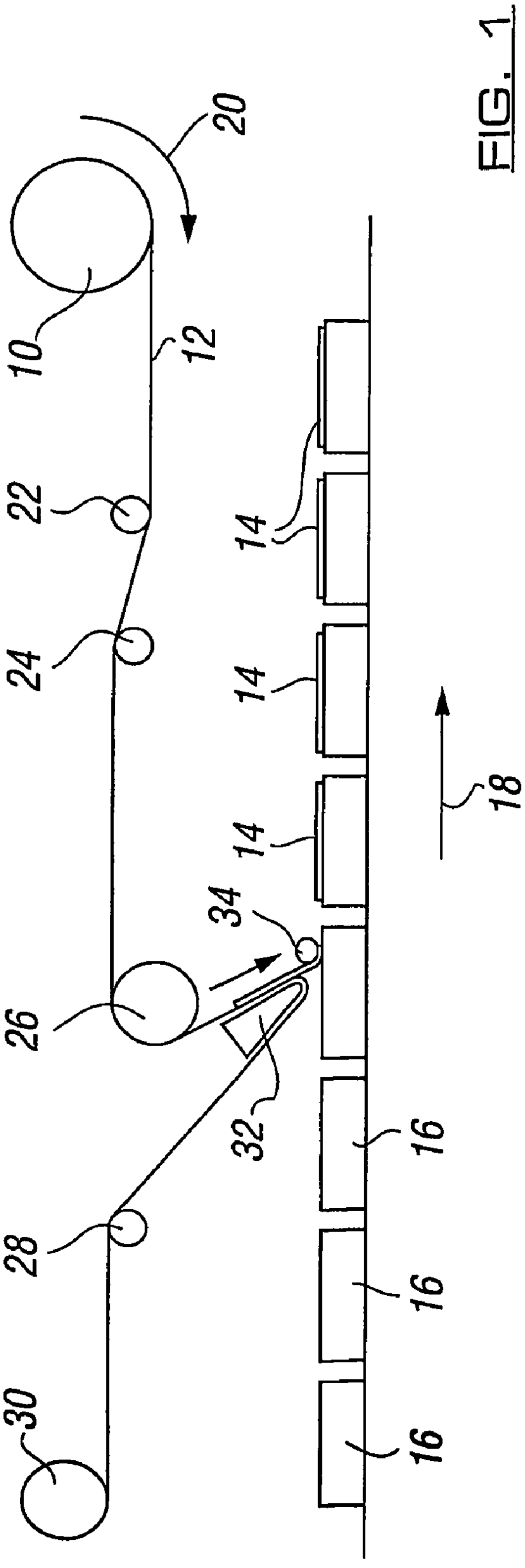
FIG. 1 shows the conventional method of applying self adhesive labels to product containers.
Figure 2:
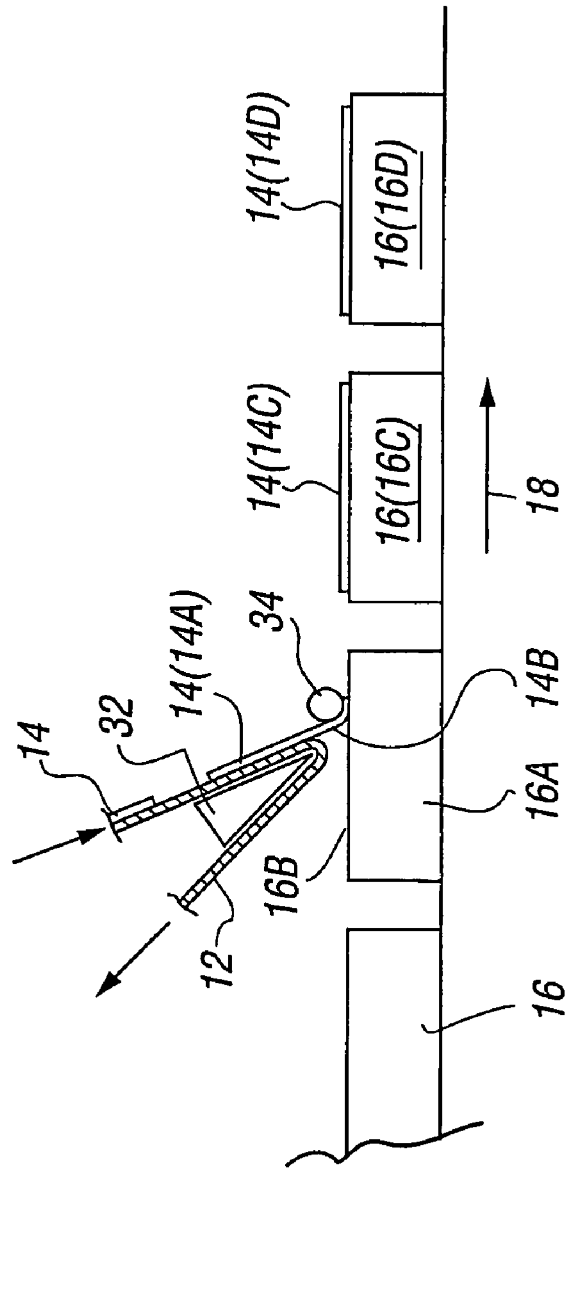
FIG. 2 shows in larger scale, a detail of the method of FIG. 1.

Referring to the drawings, in FIGS. 1 and 2, the conventional method of applying self adhesive labels is shown. A reel 10 comprises a carrier web 12, coated on one side with silicone, and labels 14 which are of the self adhesive type. The labels 14 are carried by their adhesive side on the silicone side of the web 12 at equally spaced intervals, in accordance with well known practice.

To apply the labels 14 to containers 16, which are travelling on a conveying means (not shown) in the direction of arrow 18, the web and the labels thereon are unwound in synchronism with the moving containers 16, in the direction of arrow 20. The web is guided in its travel by various rollers 22-28, and finally the web, after the labels have been removed therefrom, as will be described, is wound up to form a scrap material reel 30. The path of travel of the web is selected to suit the particular application, and the one shown is simply a diagrammatic representation.

In its travel from reel 10 to reel 30, the web 12 travels over a beak member 32, and during such travel, the web turns through an angle of nearly 360°, and as the web so turns, the label 14A (see FIG. 2) by virtue of the strength of the material of the label, self peels away from the web, so that a leading edge 14B of the label presents itself to the passing container 16A. The adhesive side of the edge is presented to the container 16A and it adheres thereto. In this connection the adhesion of the label 14A to the container 16A may be assisted by an applicator roller 34, which presses the said leading edge to the container surface 16B. Continued movement of the container 16A and the web 12 results in the label 14A being smoothly and completely applied to the container 16A, in similar manner to those labels 14C, 14D previously applied to containers 16C and 16D, shown in FIG. 2.

Movement of the containers 16 and web 12 is continuous and so the labels are applied in a smooth and continuous manner to the containers. Of course in the absence of product, no label would be applied, so in this regard the process might not be regarded as continuous. As stated herein, a main problem with the conventional method is that it requires a carrier web with labels thereon.

The present invention at least in its preferred form now to be described, does not use a carrier web. Instead the method uses a single layer printed web of paper and the like of sufficient strength to ensure that the labels will be projected from the web as it turns round a guide, the same as or functioning similar to the beak member 32. Indeed a preferred advantage of the present invention is that use can be made of the conventional machinery of the type illustrated in and described with reference to FIGS. 1 and 2.

Figure 3:
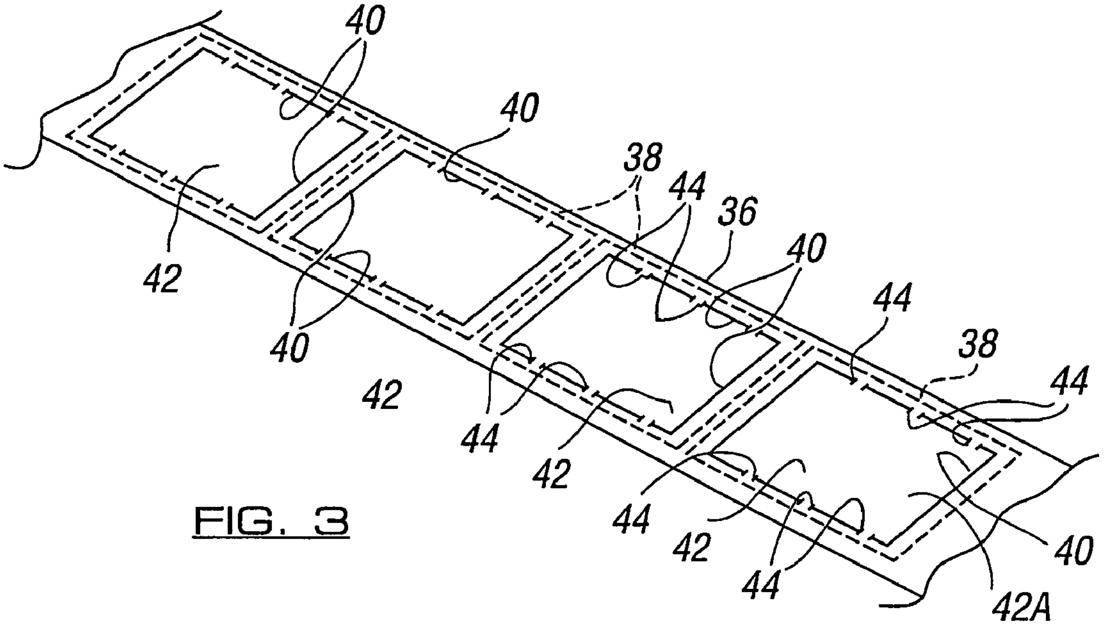
FIG. 3 shows a web of labels for use in the method of the example of the invention.

FIG. 3 shows the form of web used in this example of the invention. The web is a single web 36 of paper on which are printed label representations 38 by appropriate conventional printing. Inside the boundary of each representation is what is known as a skip cut 40, and this skip cut 40 defines the web labels 42. Skip cutting is a process involving cutting through the paper except at points 44 known as catch points. These catch points are to keep the label in the plane of the web, but only in a temporary manner until the catch points are broken, which results in the label being removed from the web.

On the underside of the web 36 is a coating of the same adhesive as is used in the conventional labels, and over the top of the printed representations is applied a coating of the silicone used in the conventional process. Thus the web can be reeled for use in the same manner as the conventional reel 10.

In use the web 36 is fed through the same machinery as the conventional web and labels, except that it may have to travel in the opposite direction (arrow 37 in FIGS. 4 and 5) having regard to how the labels 42 detach from the remainder of the web 36, and because the adhesive side desirably should must face away from the beak This does not represent any technical problem.

Figure 4:
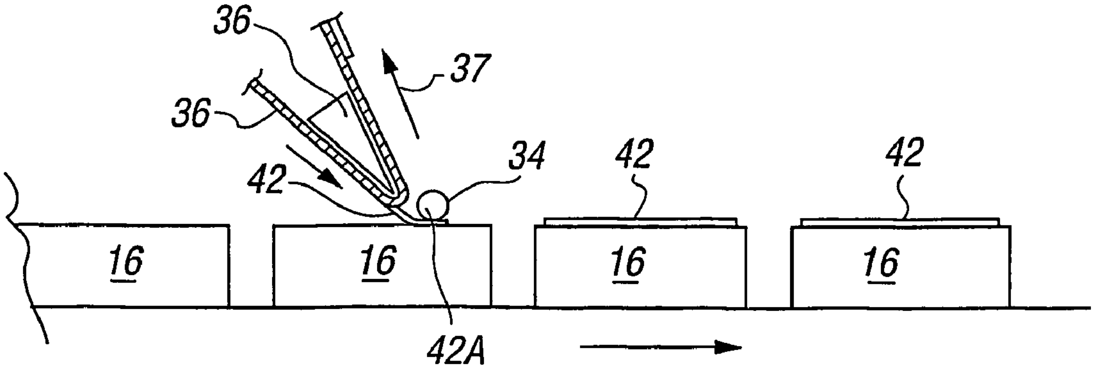
FIG. 4 shows in similar fashion to FIG. 2, the example of the method of the present invention.
Figure 5:
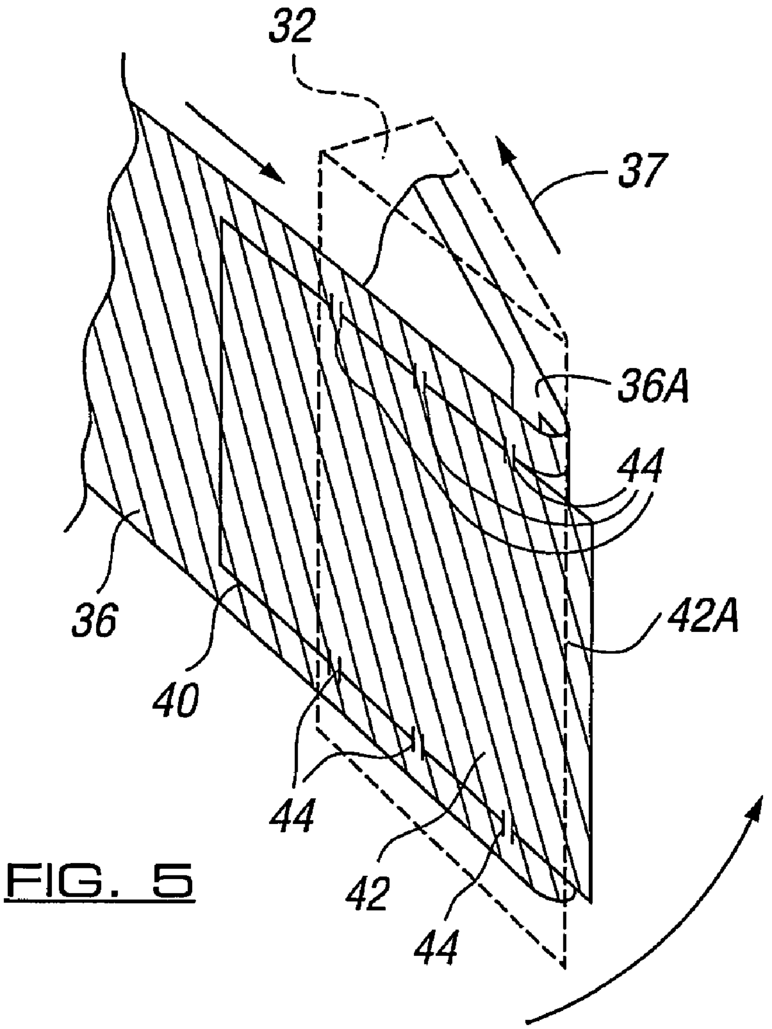
FIG. 5 is an enlarged underneath view of the label web of FIG. 3 when it passes round the guide of the machinery of FIGS. 1 and 2 and shows how the label is projected from the web.

The catch points 44 are arranged so that as the web is passed round the beak 32, the leading edge 42A of the label will be deflected from the plane of the web 36, as shown in FIGS. 4 and 5, and as in the conventional method will attach to the container 16 underneath. As in the conventional method, the attachment of the adhesive side of the label 42 to the container 16, with assistance from the pressure roller 34 if needed, results in the application of the whole label 42 to the container 16. During this application, the catch points 44 will easily break and will not cause any hindrance to the effective application of the labels 42.

FIG. 5 provides a clearer indication of how the labels 42 detach from the web 36 during the inventive process. As the web 36 travels round the beak 32, the leading edge 42A of the label 42 deflects from the plane of the web 36, and the skeletal waste 36A of the web travels round the beak 32 and eventually to a waste reel similar to reel 34.

Figure 6:
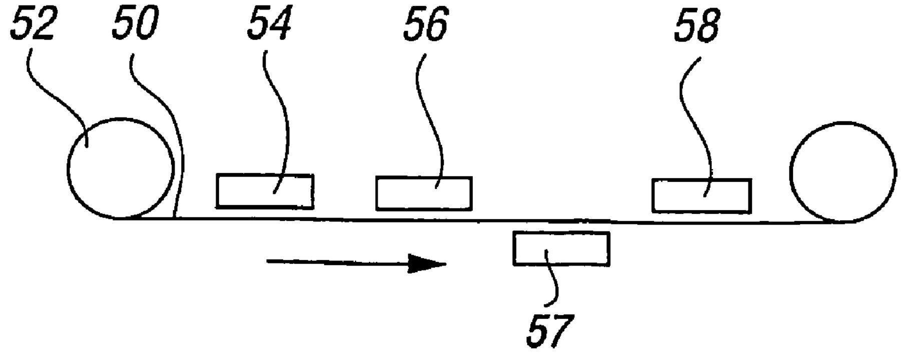
FIG. 6 is a view showing the basic steps involved in making the web of FIG. 3.

FIG. 6 shows in a simple form the various steps which may be performed on the stock paper web to produce the web shown in FIG. 3. The raw papers stock 50 is shown as being unwound from reel 52, and it first passes a print station 54 where the representations 38 are printed on the web. Next, the silicone covering for the printing is applied at station 56. The next station 57 represents the adhesive application station, whereat the adhesive is applied to the underside of the web. The skip cuts are applied at the station 58. If the web is multiple width, then at another station it is cut into individual label web widths, as is conventional and as required. FIG. 6 shows the various steps being performed in a single pass, but of course the individual steps can be carried out in any sequence and in different passes as will suit the user.

It should be mentioned again that the location and number of the catch points and the design of the guide have to be taken into account for the effective operation of the method of the invention. The catch points should be located so that a leading edge of the label will project out of the plane of the web as the web passes round the beak, or any such catch points in that leading edge may have to be pre-broken before the label reaches the beak. Again, the shape of the guide may be important for ensuring the reliable deflection of the leading edge of the label from the web as it passes round the guide. The guide may be shaped depending upon the shape of the labels.

It is also to be noted that attention has to be paid to the guiding of the web to the beak and the take up of the waste, so that preferably the adhesive side of the web does not contact any of the guide rollers to which it will stick, or the beak.

Figure 7:
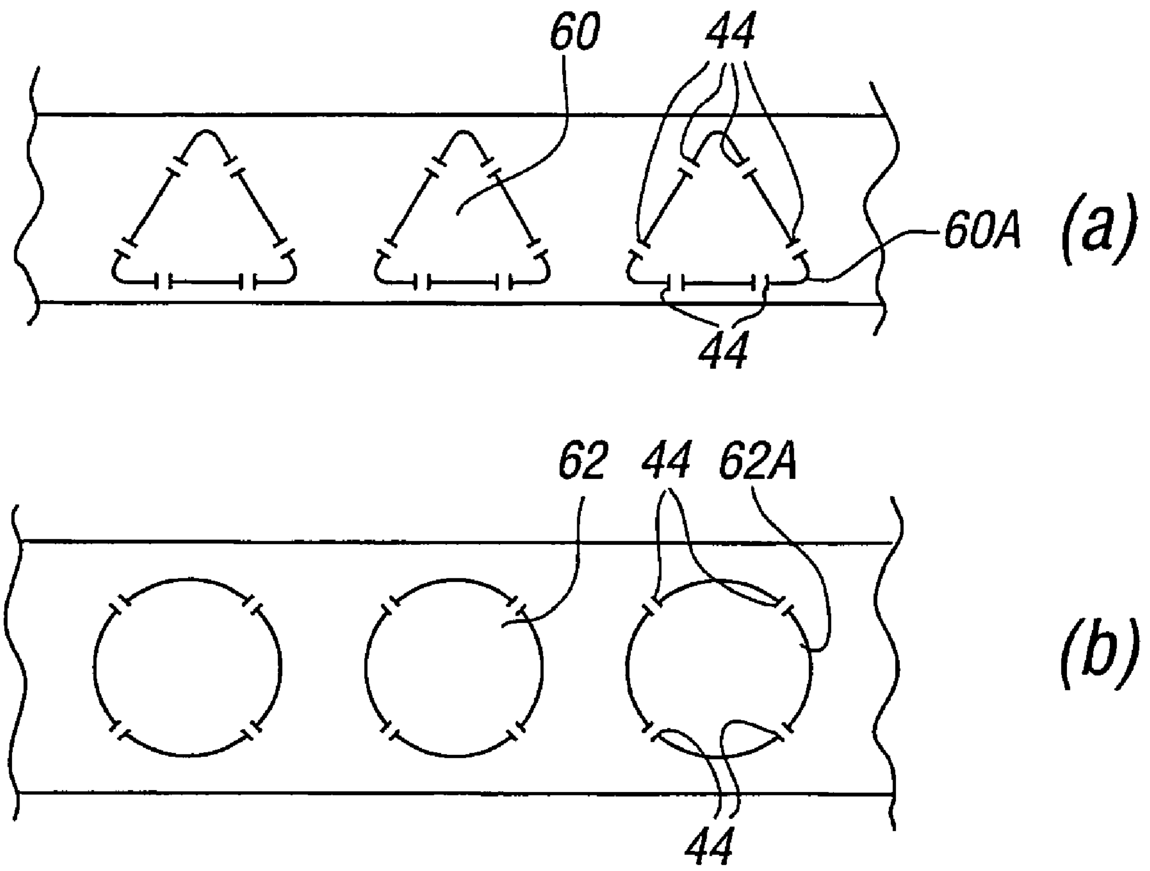
FIG. 7 is a plan view showing at (a) and (b) some alternative label shapes and catch point arrangements.

FIG. 7 shows that other shapes of label may be used, and again it is noted that the catch points 44 in the triangular labels 60 and in the round labels 62 are located rearwards of the leading edges 60A and 62A of the labels, so that such leading edges in use will project from the plane of the web during passage of the web around the guide 32.

In all cases, the number of catch points will be determined by a compromise between the need for the labels to be held to the web and the ease with which the labels can be removed from the web.

Should it be that a portion of the label has to be left free of silicone, for example to later print a "use by" date on each label, then appropriate relieving of the adhesive must also be provided for to enable the web to be reeled. This may be done by omitting a strip in the adhesive layer, and arranging for that strip which has no adhesive to register with the portions on the labels which have no silicone.

The labels could be applied by hand from the web. Also, as with the conventional system, the labels will not be applied if there is no container at the application station.

A number of advantages result from the invention, including that the amount of printer waste is reduced, the customer waste is reduced, the labels can be run through conventional machinery, cost savings result from lower material costs leading to lower prices, and larger margins, and no laminating is required.

The invention claimed is:

1. A method of applying self adhesive labels (42) directly to a surface of a product container (16), said labels (42) in a single layer web (36) on which the labels are printed at spaced intervals, on a first surface, and the label boundaries are defined in the web by lines of cutting (40) passing through the web leaving the so defined labels (42) connected to the remainder of the web (36) by catch points (44), and wherein to remove the labels (42) the web is fed around a guide (32), of the same function and operation as the conventional beak of conventional applicator machinery for self adhesive labels carried on a release web, which causes the leading edge (42A) of each of said labels to protrude out of the plane of the web (36), said labels having a second surface opposing said first surface, said second surface having adhesive thereon, whereby the adhesive on said second surface opposing the first surface of the labels contacts and adheres said labels (42) to the product container and wherein the said protruding leading edge (42A) is moved directly into contact with said surface of the product container to which it is being applied, and adheres to the said product container surface prior to release of the said label from the web to form a means whereby the remainder of said label can be extracted from the web by the breaking of the catch points as the relative movement between the web and the product container causes the catch points joining the said label to the web to be broken and the release of the label from the web and the other labels defined on the web, and the remainder material comprises only that of the single web and the web is arranged with respect to the guide (32) such that the second surface of the label and the adhesive thereon faces away from the guide (32) and requires no change in condition to be performed on the label during movement from the web to being applied to the product container.

2. A method according to claim 1, wherein the leading edge (42A) of each label (42) is sufficiently devoid of catch points (44) to ensure that it will reliably protrude from the web (36) when it first passes round the guide (32).

3. A method according to claim 1, wherein the adhesive is applied immediately before the web (36) passes round the guide (32).

4. A method according to claim 1 wherein the said first surface has printing disposed thereon, and has silicon applied to said first surface over said printing, to act as a release material.

5. A method according to claim 2, wherein the labels (42) are of the self adhesive type.

6. A method according to claim 2, wherein there is a water application station to wet the adhesive to make it effective before application of the labels (42) to the containers (16).

7. A method according to claim 2, wherein the adhesive is applied immediately before the web (36) passes round the guide (32).

8. A method according to claim 1, wherein the adhesive is applied immediately before the web (36) passes round the guide (32).

9. A method according to claim 5, wherein the adhesive is applied immediately before the web (36) passes round the guide (32).

* * * * *